June 23, 1936.  H. A. CURTIS  2,044,774
TREATING PHOSPHATE ROCK TO ELIMINATE FLUORINE
Filed Nov. 15, 1934
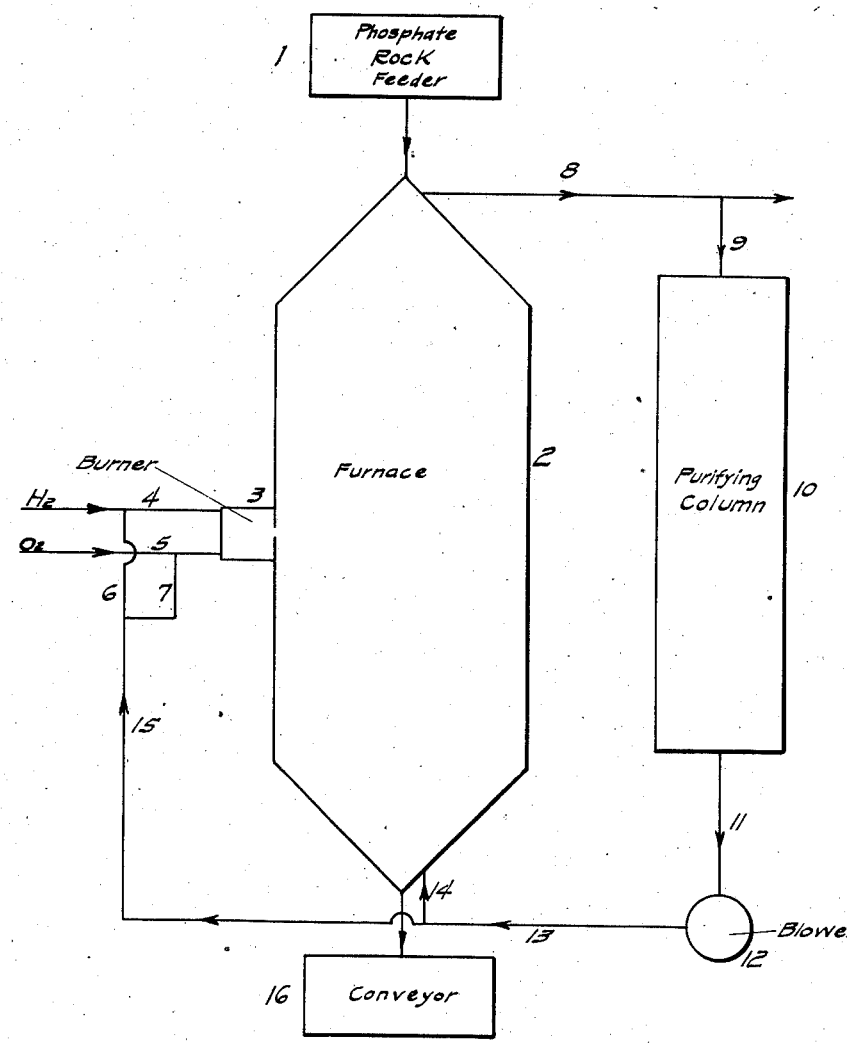
Inventor
Harry A. Curtis
Arthur L. Davis
By
Attorney Patented June 23, 1936

2,044,774

UNITED STATES PATENT OFFICE 2,044,774

TREATING PHOSPHATE ROCK TO ELIMINATE FLUORINE

Harry A. Curtis, Knoxville, Tenn., assignor to Tennessee Valley Authority, Wilson Dam, Alabama, a corporation Application November 15, 1934, Serial No. 753,137

4 Claims. (Cl. 71—7)

(Granted under the act of March 3, 1883, as amended April 30, 1928; 370 O. G. 757)

This application is made under the Act of April 30, 1928, and the invention herein described, if patented, may be manufactured and used by or for the Government for governmental purposes without the payment to me of any royalty thereon.

This invention relates to the process of treatment of phosphate rock.

One of the objects of this invention is the conversion of phosphate rock into a product in which a substantial portion of the phosphorus is in such a form as to be available for plant food. Another object of this invention is the removal of a substantial portion of fluorine which occurs in a combined form in phosphate rock. Still another object of this invention is the treatment of the phosphate rock to render it suitable for use as a stock food. Other objects of this invention include the conversion of phosphate rock into a product which is a more suitable raw material for the production of phosphorus and/or its compounds.

Phosphate rock is predominantly a calcium phosphate with a few percent of fluorine in chemical combination, accompanied by small proportions of carbonates, silicates and silica. Ground phosphate rock, carrying a sufficient amount of silica or with added silica, has been rendered "available" as a plant food by heating to 1300 to 1400° C. in an atmosphere made up largely of steam with the removal of most of the combined fluorine. No method has heretofore been found whereby the important factors of gaseous atmosphere with high partial pressure of water vapor and temperature may be adequately controlled to obtain economical conversion of the phosphate rock into "available" form.

I have found that, by passing fine granular phosphate rock thru a suitable apparatus continuously and countercurrently to a stream of gas consisting essentially of steam produced by the direct combustion of hydrogen and oxygen, a product of high plant food availability is obtained. The thermal requirements of the process be reduced by circulating a part of the steam thru the apparatus in a suitable manner.

A diagrammatic vertical section of one form of apparatus for the embodiment of my process is shown in the accompanying drawing. The charging means 1, is arranged to supply fine granular phosphate rock continuously to the thermally insulated and refractory lined furnace 2. The phosphate rock is heated by the combustion of hydrogen and oxygen supplied to a plurality of burners located about the midsection of the furnace of which burner 3, is representative. Each of these burners is supplied by hydrogen and oxygen thru lines 4 and 5 respectively. Further control of combustion is afforded by regulation of the admission of steam from lines 6 and 7 to either or both of the hydrogen and oxygen supply lines as required. The gases evolved are withdrawn near the top of the furnace 2, thru line 8, and a portion of these gases is carried thru line 9, to the purifying column 10, containing a solid chemical reagent for removal of fluorine compounds and carbon dioxide, where the fluorine compounds and other undesirable compounds are separated. The gas from column 10, which is principally steam, is carried by line 11, to supply the blower 12, which delivers the steam to line 13. Line 14, delivers steam from line 13 to near the bottom of furnace 2 and line 15 supplies steam to lines 6 and 7 as required for the control of the combustion of the hydrogen and oxygen. Conveyor 16, withdraws the treated phosphate rock from furnace 2.

One example of the operation of my process is given for the treatment of Tennessee brown phosphate rock. The natural rock is crushed and screened to remove portions larger than 4 mesh in diameter or fine phosphate rock is agglomerated and screened to remove portions larger than 4 mesh in diameter for use as charging stock. This charge is fed into the top of the furnace where it is heated by the steam and other vapors ascending from the high temperature zone below. This preheated rock gradually passes to the high temperature zone where a temperature of 1300 to 1400° C. is maintained by the combustion of hydrogen with oxygen. The rate of flow of the rock thru the high temperature zone is controlled to permit sufficient time for the removal of most of the fluorine contained in the rock. The rock continues in its course to the bottom of the furnace while being cooled by a countercurrent flow of vapors consisting principally of steam and obtained by the purification of a portion of the gases which have been withdrawn from near the top of the furnace.

It is evident that there are numerous factors which will influence conditions for the most satisfactory operation of my process, the actual limits of which cannot be established except by a detailed study of each set of raw materials and finished products involved.

The hydrogen and oxygen may be conveniently and economically produced by the electrolysis of sodium hydroxide solution with the direct production of the correct volume ratios for combustion. Any other suitable means for the production of either or both of these gases may be utilized. The fine, granular phosphate rock or the fine, granular agglomerated phosphate rock is not required to be limited to any particular size but from the practical standpoint preferably contains little material finer than 80 mesh or coarser than 4 mesh. It has been found that the presence of silica is essential for the most effective defluorination of phosphate rock. The amount of silica naturally accompanying the phosphate is usually present in sufficient quantities but in the event of a deficiency this may be made up by the appropriate addition of silica or silica-bearing material. The furnace is preferably designed so that the gases passing upward from the high temperature zone of 1300 to 1400° C. are cooled to a temperature of 100 to 150° C. by the descending rock, and so that the heated rock from the higher temperature zone is cooled to a temperature of 100 to 150° C. by the ascending steam which has been admitted near the bottom of the furnace.

All of the gases withdrawn from the top of the furnace may be purified if it is considered desirable to recover the material that would otherwise be called impurities in the steam or if it is considered desirable to use the steam in excess of that required by the process. The gas purification will ordinarily consist in the removal of the fluorine compounds by dry purification only but other constituents of the gas, such as carbon dioxide, may be removed as well if desired.

I claim:

1. Continuous process of treating phosphate rock to render it available for plant food which comprises heating a mass of fine, granular phosphate rock by contact with the product of combustion of a mixture of hydrogen and oxygen, controlling the temperature of the product of combustion of the mixture of hydrogen and oxygen by the admission of steam to maintain the phosphate rock just below its sintering point, treating a portion of the gases evolved for the removal of combined fluorine and carbon dioxide to produce a substantially purified steam, and contacting the mass of heated phosphate rock countercurrently with the purified steam.

2. Continuous process of treating phosphate rock to render it available for plant food which comprises heating a mass of fine, granular phosphate rock, to a temperature just below the sintering point of the phosphate rock, by contact with the product of combustion of a mixture of hydrogen and oxygen, in the substantial absence of other gaseous materials, treating a portion of the gases evolved for the removal of combined fluorine and carbon dioxide to produce a substantially purified steam, and contacting the mass of heated phosphate rock countercurrently with the purified steam.

3. Continuous process of treating phosphate rock to render it available for plant food which comprises heating a mass of fine, granular phosphate rock, to a temperature just below the sintering point of the phosphate rock, by contact with the product of combustion of a mixture of hydrogen and oxygen, in the substantial absence of other gaseous materials, and contacting the mass of heated phosphate rock countercurrently with steam.

4. Continuous process of treating phosphate rock to render it available for plant food which comprises heating a mass of fine, granular phosphate rock, to a temperature just below the sintering point of the phosphate rock, by contact with the product of combustion of a mixture of hydrogen and oxygen, in the substantial absence of other gaseous materials.

HARRY A. CURTIS.